F. V. RISINGER.
SHOCK ABSORBER.
APPLICATION FILED NOV. 2, 1915.
1,182,794.
Patented May 9, 1916.
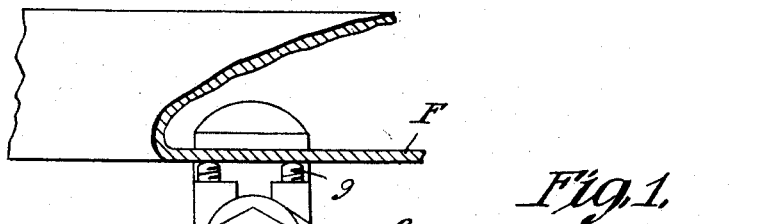
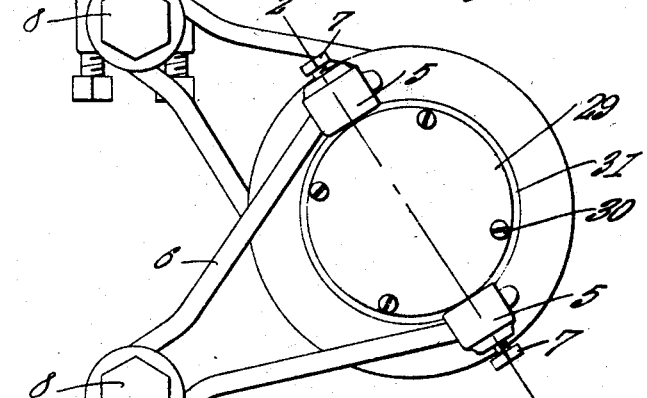
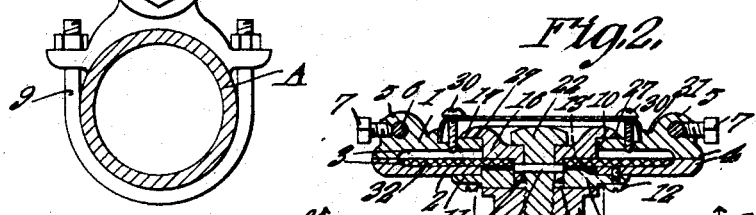
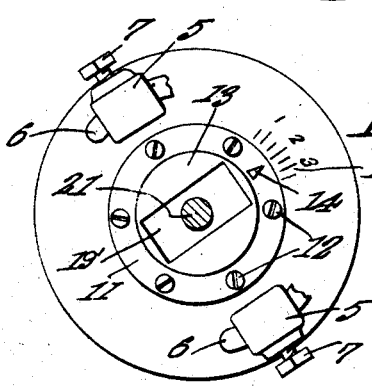
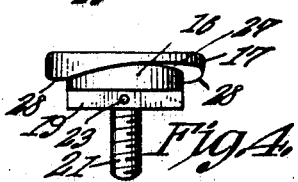
Witnesses
F. V. Risinger, Inventor
by C. A. Snow & Co.
Attorneys

UNITED STATES PATENT OFFICE.

FRANK V. RISINGER, OF YOUNGSTOWN, OHIO, ASSIGNOR TO THE BLOCK GAS MANTLE CO., OF YOUNGSTOWN, OHIO.

SHOCK-ABSORBER.

1,182,794.     Specification of Letters Patent.     Patented May 9, 1916.

Application filed November 2, 1915. Serial No. 59,222.

*To all whom it may concern:*

Be it known that I, FRANK V. RISINGER, a citizen of the United States, residing at Youngstown, in the county of Mahoning and State of Ohio, have invented a new and useful Shock-Absorber, of which the following is a specification.

The present invention appertains to shock absorbers, and relates more especially to shock absorbers used upon automobiles or other vehicles.

It is the object of the invention to provide a shock absorber of novel and improved construction whereby the parts to which the device is attached may have free movements relative to one another for a limited distance, and when the parts are moved beyond said distance, the device will operate to retard or check the movement of the parts either toward or away from one another.

The invention embodies a pair of oscillatory friction members connected by lever arms to the frame and axle or other relatively movable parts, and means whereby said members can rotate freely relative to one another for a limited distance and whereby when the parts to which the arms are connected are moved either toward or away from one another beyond the allotted distance, the members are moved tightly together to provide a frictional drag which will resist the further movement of the parts, thus to absorb the shocks which might otherwise occur.

It is also within the scope of the invention to provide a shock absorber of the nature indicated having improved features of construction, the device being comparatively simple, compact and inexpensive in construction, and also being thoroughly practical and efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the shock absorber as applied to the frame and axle of a vehicle. Fig. 2 is a diametrical section of the device taken on the line 2—2 of Fig. 1. Fig. 3 is a sectional view taken on the line 3—3 of Fig. 2. Fig. 4 is a side elevation of the pivotal and connecting element by which the disks are attached together. Fig. 5 is a diagrammatical view illustrating in section the cam surfaces laid out flat.

In carrying out the invention, there is employed a pair of companion disks 1—2 disposed side by side, and having the circular recesses 3 in their adjacent sides, providing the annular contacting ribs or surfaces 4. These disks 1—2 are assembled in a manner which will hereinafter appear, and they are attached to the frame F and axle A of a motor vehicle, as illustrated in Fig. 1, although it will be understood that the device may be employed in various capacities for controlling the movements of two parts relative to one another, the same as with the frame F and axle A of the vehicle. To attach the disks to the frame and axle, the remote sides of the disks are provided with diametrically opposite outstanding apertured lugs 5 receiving the terminals of a pair of V-shaped lever arms 6, set screws 7 being carried by the lugs 5 for clamping the terminals of said arms. The arms 6 are arranged at an angle relative to one another, and their ends are pivotally engaged with bolts or other pivotal elements 8 carried by a pair of clamps 9 which are attachable to the frame F and axle A. Said clamps may be of any suitable character so long as they serve their functions of pivotally connecting the lever arms with the parts.

The disks 1—2 are provided with central circular openings 10, and a circular plate 11 is secured to the outer side of the disk 2 by means of screws 12 or other securing elements. The plate 11 has a boss 13 fitting within the opening 13' of the disk 2, and the plate 11 also has a pointer 14 coöperable with graduations 15 upon the outer side of the disk 2. The pointer 14 and graduations 15 enable the plate 11 and disk 2 to be properly assembled for accommodating the spacing of the frame and axle relative to one another, which is different upon various motor vehicles. This will be more fully pointed out hereinafter.

A circular member 16 is mounted for rotation within the opening 10 of the disk 1 and has an outturned annular flange or lip 17 overlapping the outer side of the disk 1 around the opening 10 thereof. Said member 16 has an inwardly projecting rectangular or non-circular boss 19 fitting slidably in a similarly shaped opening 19′ with which the plate 11 is provided, whereby the member 16 can slide to and from the disk 2 but is constrained to turn therewith. The member 16 and its boss 19 have a bore or aperture 20 through which a bolt 21 is fitted, said bolt having a head 22 confined within the socket or cavity formed by the lip 17 and seating against the member 16. The bolt 21 is secured to the member 16 by means of a pin or rivet 23 engaged through the boss 19 and bolt 21. The threaded end of the bolt 21 projects from the boss 19 and through the opening 19′ of the plate 11. A nut 24 is threaded upon the protruding portion of the bolt 21 and bears against the plate 11, and a lock nut 25 is also threaded upon the bolt 21 to hold the nut 24 in place. If desired, a washer 26 can be disposed between the nuts.

The contacting surfaces of the disk 1 and lip 17, said surfaces being circular, are undulatory, as at 27, to provide the rounded cams 28 which fit loosely between one another, said cams being normally spaced from one another as indicated in Fig. 5.

A sheet metal cap 29 has its rim or flange seating against the outer side of the disk 1 around the lip 17, so as to inclose the member 16 and accompanying parts, the cap 29 being secured to the disk 1 by means of screws 30 or other securing elements engaged through the cap 29 and taking into the disk 1 adjacent the rim of the cap. The outer side of the disk 1 is preferably provided with an annular rib 31 within which the rim of the cap fits snugly. This cap is adapted to be filled with lubricant, to lubricate the contacting surfaces of the disk 1 and member 16.

A disk 32 of absorbent material is disposed within the recesses 3 of the disks upon the boss 19, and is adapted to be soaked with lubricant, whereby the lubricant is supplied between the annular surfaces or ribs 4.

In operation, when the lever arms 6 are in normal position, the cams are spaced apart, as seen in Fig. 5, and this allows the arms 6 to swing slightly relative to one another in either direction without causing the cams to ride upon one another. It is evident that when the arms 6 are swung relative to one another, they rotate the disks 1—2 relative to one another, and this will also rotate the cams 28. Ordinarily, therefore, the arms 6 can swing a limited amount relative to one another with little or no resistance, but should the arms be swung beyond a predetermined amount, the cams 28 will ride upon one another. Consequently, when the cams ride upon one another, the lip 17 is moved away from the disk 1, so that the disk 1 is moved toward the disk 2, and since the disk 2 cannot move away from the member 16, the two disks will be moved together tightly, creating a friction drag between the contacting surfaces 4 of the disks, which will tend to prevent or retard the relative rotation of the disks. Consequently, this will impede or check the movement of the frame and axle relative to one another for avoiding shocks which might otherwise occur. The farther the arms are swung relative to one another beyond the distance allowed, the more will the cams 28 ride upon one another, and the tighter will the disks be forced together to increase the frictional drag proportionately.

The parts of the device can be readily assembled and detached, and the contacting surfaces will be lubricated by the means above provided.

In applying the device to various vehicles wherein the frame and axle are placed at different distances apart, the plate 11 can be set at various angles relative to the disk 2 by means of the pointer 14 and graduations 15, so that when the arms 6 are arranged at the normal angle relative to one another, the cams 28 will be spaced apart. Thus, if the plate 11 is moved in one direction relative to the disk 2, the arms 6 will be normally moved closer together, whereas if the plate 11 is moved in the opposite direction with respect to the disk 2, the arms 6 will be normally shifted at a greater angle relative to one another. The normal position of the plate 11 in any given case is determined before the apertures are drilled in the plate 11 and disk 2 for the reception of the screws 12, although the disk 2 and plate 11 can be adjustably connected so that they can be shifted angularly relative to one another.

The present device provides admirable means for controlling the movements of the frame and axle or other parts relative to one another, whereby shocks or sudden jerks are eliminated, since the closer the parts are moved together, or the farther they are moved apart, the greater will be the resistance offered by the device.

Having thus described the invention, what is claimed as new is:

A shock absorber embodying a pair of disks having central openings and contacting frictional surfaces, a plate attached to the outer side of one of said disks and having a non-circular opening, a circular member fitting rotatably in the opening of the other disk and having a non-circular boss fitting in said non-circular opening, a bolt carried by said boss projecting through said non-circular opening, and a retaining element upon said bolt and bearing against said plate, said member having an annular lip overlapping the outer side of the second mentioned disk, the contacting surfaces of said lip and second mentioned disk being undulatory to provide cams normally disposed between one another.

In testimony that I claim the foregoing as my own, I have hereto affixed my signature in the presence of witness.

FRANK V. RISINGER.

Witness:
O. H. KAUFMAN.